United States Patent [19]

Pfleger

[11] Patent Number: 5,054,433
[45] Date of Patent: Oct. 8, 1991

[54] EXPANDABLE BELT

[76] Inventor: Frederick W. Pfleger, 1152 Barbara Dr., Cherry Hill, N.J. 08003

[21] Appl. No.: 591,257

[22] Filed: Oct. 1, 1990

Related U.S. Application Data

[63] Continuation-in-part of Ser. No. 536,191, May 29, 1990, Pat. No. 5,002,287.

[51] Int. Cl.$^5$ .............................................. A01K 27/00
[52] U.S. Cl. ................................................. 119/106; 2/338
[58] Field of Search ........................ 119/96, 106, 156; 24/16 PB, 16 R, 30.5 P; 2/338, 311, 337

[56] References Cited

U.S. PATENT DOCUMENTS

| | | | |
|---|---|---|---|
| 345,767 | 7/1886 | Buckley | 24/20 R X |
| 603,760 | 5/1898 | Gair | 2/338 |
| 3,063,058 | 11/1962 | Vollet | 2/338 |
| 4,031,859 | 6/1977 | Stewart | 119/106 |
| 4,910,832 | 3/1990 | Schaub et al. | 24/20 R |

Primary Examiner—Gene Mancene
Assistant Examiner—R. Thomas Price

[57] ABSTRACT

A resilient material belt provided with openings substantially across the width of the belt. The openings having one portion close to one edge of the belt and the opposite portion of the opening located a distance in toward the center of the belt from the opposite edge of the belt. The opening is located in this manner to retain the belt in normal configuration up to a given tension on the belt. At the given tension the material between the edge of the belt and the opening on the side where it is closest to the edge breaks, allowing the belt to elongate by the distortion of the openings in the belt.

10 Claims, 1 Drawing Sheet

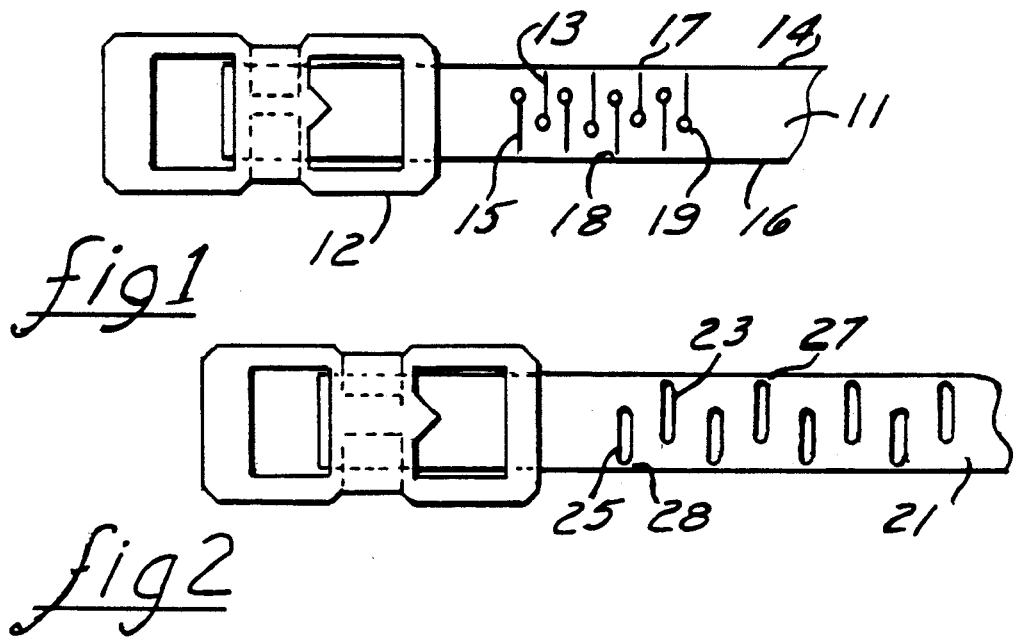
fig 1
fig 2
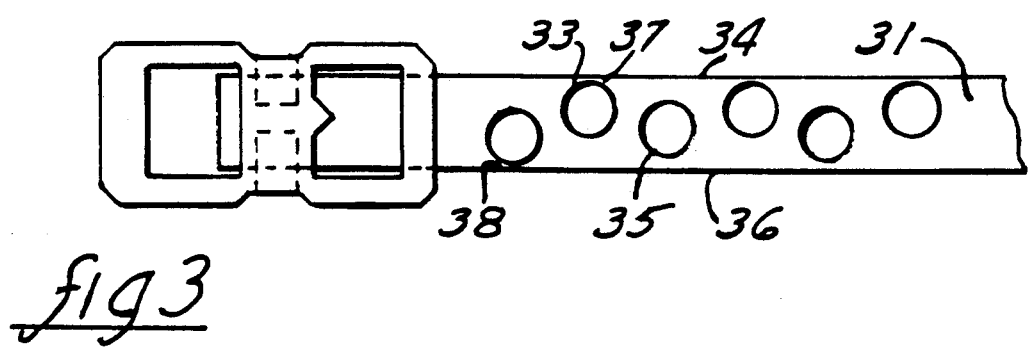
fig 3
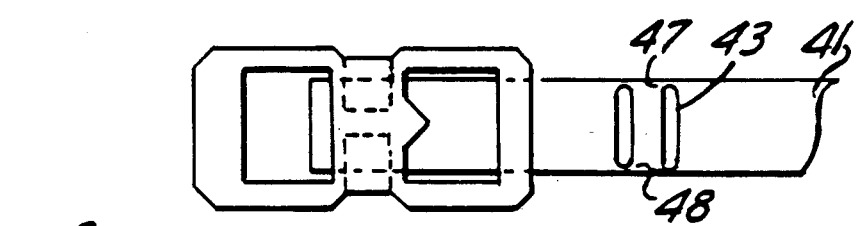
fig 4
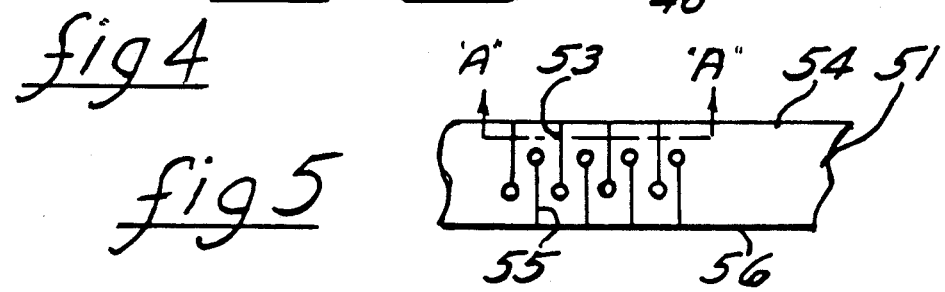
fig 5
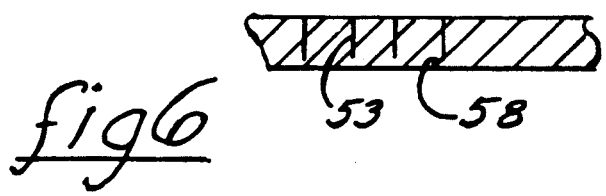
fig 6

EXPANDABLE BELT

This application is a continuation in part of application Ser. No. 07/536,191 filed May 29, 1990, now U.S. Pat. No. 5,002,287.

BACKGROUND OF INVENTION

While the belt configuration of this invention has been designed, in particular for cat flea and tick collars, it is appreciated that this invention is capable of many varied applications and shapes all of which are intended to be comprehended herein.

As shown in my patent application filed May 29, 1990 and assigned Ser. No. 07/530,191, the belt used for a cat flea collar is expandable to provide safety for the cat. Although safety is provided, the openings in the belt start to distort allowing lengthening of the collar length at low tensions. This lengthening makes the applying of the collar onto the cat a little more difficult since the person applying the collar must observe that the openings are not opened too far while applying the collar. In order to make applying the collar to the cat easier, the openings in the collar are made of a size that a web is provided between one edge of the belt and a portion of the opening. The size of the web is designed so that it is breakable when a designed tension is applied to it. In the application of cat collars the breakage force could be related to the cats weight. After breaking of one or more of the webs, the collar will lengthen to prevent injuring the cat. The collar will return to normal length if the tension is removed from the belt. It is possible to make the openings large enough so that a web is located at each edge. If this is done the collar will break at the designed load. The breaking will provide the safety to the cat but it would mean destroying the collar on each occurrence of the designed tension being applied to the collar.

SUMMARY OF THE INVENTION

It is an important object of this invention to provide an improved belt construction for a collar that is easy to apply while still providing expandability when tension above a given amount is applied to the belt.

It is another object of this invention to provide a belt with these characteristics that is economical to manufacture.

It is another object of this invention to provide a belt with these characteristics that is pleasing to look at.

Other objects of the present invention will become apparent upon reading the following specifications and referring to the corresponding drawings which form a material part of this disclosure.

BRIEF DESCRIPTION OF DRAWINGS

FIG. 1. Is a view of one version of the belt which shows the openings as slits with one rounded end.

FIG. 2. Is a view of a belt which shows the openings shaped as rectangular slots with rounded edges.

FIG. 3. Is a view of the belt with the openings shown as round holes.

FIG. 4. Is a view of the belt with the openings shown as rectangular slots with rounded ends close to each side forming webs on each side.

FIG. 5. Is a view of the belt with the openings as slits which do not completely penetrate the belt.

FIG. 6. Is an enlarged sectional view through the belt substantially along line A—A of FIG. 5.

DESCRIPTION OF PREFERRED EMBODIMENT

In stretchable belting such as cat collars it is desirable to restrict the start of the stretching action until after a given tension is applied to the belt. In order to accomplish this these belts are provided with openings that have one portion of the opening located close to one surface of the belt forming a web between the openings and the surface of the belt. As shown in FIG. 1, a Belt 11 of resilient material is fastened to a Buckle 12 by any suitable means. The belt is provided with Slits 13 that extend transverse toward one Edge 14. The slits do not break through the Belt Edge 14 but leave a web of Material 17 between the Slit 13 and the Belt Edge 14. Alternate Slits 15 extends toward the Opposite Edge 16. A Web 18 is left between the end of the Slit 15 and the Edge 16. As a result before tension is applied to the belt the belt retains its normal length and configuration. When the tension in the belt reaches a designed amount the Webs 17 and 18 break allowing the Slits 13 and 15 to open resulting in the Belt 11 lengthening.

As shown in FIG. 1, the Slits 13 and 15 are formed at their inner surface as Circular Ends 19. In some materials the material will rip from a sharp corner. In order to prevent this ripping action from a sharp corner a rounded surface is made thus eliminating the tearing.

As shown in FIG. 2, the Slits 13 and 15 of FIG. 1 are shown as rectangular Slots 23 and 25 with rounded ends. In some materials it is easier to control the punching of the slots in place of cutting slits; as a result, this design is shown as another configuration which provides the same results between the rounded end of the Slots 23 and 25 and the edges of the belt are the breakable Webs 27 and 28.

As shown in FIG. 3, the Openings 33 and 35 are shown as round holes offset so that the distance of an edge of the hole to the Edges 34 and 36 of the Belt 31 forms the breakable Webs 37 and 38. After the Webs 37 and 38 break the belt will elongate in the same manner as with slit or slot configuration of FIGS. 1 and 2. It is obvious that the round holes could have a larger radius at the inner end and a small radius at the edge forming the web to provide a tear drop shape instead of a round hole.

FIG. 4 shows the belt with the Opening 43 in the form of elongated slots similar to those of FIG. 2 but where the length is increased to almost equal the width of the belt. This length thus forms Webs 47 and 48 on each side of the belt. As a result, when the design tension is applied to the belt the belt breaks preventing harm to the animal wearing it. In this design the belt is lost since it breaks into two pieces.

In many cases the edges of the belt are not uniform enough to accurately position the opening to form the desired web. As a result, as shown in FIG. 5, the Slits 53 and 55 are made as shown in FIG. 1 but the cut is not made all the way through the belt material. The Slits 53 and 55 are cut through the Edges 54 and 56. As a result, a Web 58 is formed on one surface of the belt. The Web 58 can extend from an Edge 54 or 56 of the Belt 51 to the end of the slit or it can be shortened to provide the desired breaking strength for a given thickness web.

Although this disclosure shows the slits and openings generally perpendicular to the belt edges, it is obvious that these slits and openings can be at various angles with the sides.

The present invention has been described in some detail by way of illustration and examples for purposes of clarity and understanding. It is understood that certain changes and modifications may be made within the spirit of the invention.

What is claimed is:

1. An integral resilient material belt of a given length having a first end and a second and of a given width having a first edge and a second edge, and of a given thickness having a first surface and a second surface, and of a predetermined elongating strength, a buckle secured to said first end, said second end adaptable to be secured by said buckle comprising; a plurality of slits each having a first slit end and a second slit end cut through said thickness of said belt in a direction substantially across the width of said belt located between said first edge and said second edge and positioned along the length of said belt, a first web formed between each of said first slit end of said slit and said first edge, a second web formed between each of said second slit end of said slit and said second edge, said first web breakable at an elongating strength lower than said predetermined elongating strength, said plurality of slits separate from each other enabling the elongation of said belt at the elongating strength lower than said predetermined elongating strength after breaking of said first web.

2. An integral resilient material belt according to claim 1 wherein said first web and said second web alternate between said first edge and said second edge for successive slits.

3. An integral resilient material belt of a given length having a first end and a second end, of a given width having a first edge and a second edge, of a given thickness having at first surface and a second surface, and of a predetermined elongating strength comprising; a buckle secured to said first end, said second end adaptable to be secured by said buckle, a plurality of slits cut into said belt in a direction substantially across said width, substantially through said thickness forming a web between a bottom of each of said plurality of slits said second surface, the webs breakable at an elongating strength lower than said predetermined elongating strength, said plurality of slits separate from each other enabling the elongation of said belt at an elongating strength approximating that of said elongating strength lower than said predetermined elongating strength after breaking of said web.

4. An integral resilient material belt according to claim 3 wherein said slits alternate from said first edge and said second edge.

5. An integral resilient material belt of a given length having a first end and a second end, of a given width having a first edge and a second edge, of a given thickness having a first surface and a second surface, and of a predetermined elongating strength comprising; a buckle secured to said first end, said second end adaptable to be secured by said buckle, a plurality of openings cut through said belt substantially across the width of said belt and positioned along the length of said belt, a first web between said opening and said first edge and a second web larger than said first web between said opening and said second edge, said first web breakable at an elongating strength lower than said predetermined elongating strength, said plurality of openings separate from each other enabling elongation of said belt at the elongation strength lower than said predetermined elongating strength after breaking of said first web.

6. An integral resilient material belt according to claim 5 wherein said first web and said second web alternate between said first edge and said second edge for successive slits.

7. An integral resilient material belt according to claim 5 wherein said openings are circular in shape.

8. An integral resilient material belt according to claim 5 wherein said openings are tear drop in shape.

9. An integral resilient material belt according to claim 5 wherein said openings are rectangular in shape.

10. An integral resilient material belt according to claim 5 wherein said openings are rectangular in shape with rounded ends.

* * * * *